(12) United States Patent
Song et al.

(10) Patent No.: US 9,693,084 B2
(45) Date of Patent: Jun. 27, 2017

(54) LOCATION BASED CONTENT PROVIDING SCHEME

(71) Applicant: KT Corporation, Seongnam-si, Gyeonggi-do (KR)

(72) Inventors: Yong-jun Song, Seongnam-si (KR); Su-jin Kang, Seoul (KR); Woo-hyun Kwon, Daegu (KR)

(73) Assignee: KT Corporation, Seongnam-si (KR)

( * ) Notice: Subject to any disclaimer, the term of this patent is extended or adjusted under 35 U.S.C. 154(b) by 59 days.

(21) Appl. No.: 14/585,713

(22) Filed: Dec. 30, 2014

(65) Prior Publication Data

US 2015/0189345 A1    Jul. 2, 2015

(30) Foreign Application Priority Data

Dec. 31, 2013    (KR) .......................... 10-2013-0168939

(51) Int. Cl.
| | | |
|---|---|---|
| *H04H 60/33* | (2008.01) | |
| *H04H 60/32* | (2008.01) | |
| *G06F 17/00* | (2006.01) | |
| *G06F 17/30* | (2006.01) | |
| *H04N 21/258* | (2011.01) | |
| *H04N 21/414* | (2011.01) | |
| *H04N 21/431* | (2011.01) | |
| *H04W 4/02* | (2009.01) | |
| *H04N 21/45* | (2011.01) | |

(52) U.S. Cl.
CPC .. *H04N 21/25841* (2013.01); *H04N 21/41407* (2013.01); *H04N 21/4312* (2013.01); *H04W 4/02* (2013.01); *H04N 21/4524* (2013.01)

(58) Field of Classification Search
CPC ....................... H04N 21/25841; H04N 21/4524
See application file for complete search history.

(56) References Cited

U.S. PATENT DOCUMENTS

| | | | |
|---|---|---|---|
| 2010/0002077 A1* | 1/2010 | Viggiano | ............. G01S 13/867 348/115 |
| 2011/0035284 A1* | 2/2011 | Moshfeghi | ............. G06Q 30/02 705/14.58 |
| 2013/0198176 A1 | 8/2013 | Kim | |
| 2013/0330055 A1* | 12/2013 | Zimmermann | .... H04N 21/2743 386/240 |

(Continued)

FOREIGN PATENT DOCUMENTS

| | | |
|---|---|---|
| KR | 1020120032336 | 4/2012 |
| KR | 1020120096295 | 8/2012 |

*Primary Examiner* — James R Marandi
(74) *Attorney, Agent, or Firm* — Brundidge & Stanger, P.C.

(57) ABSTRACT

In one example embodiment, a method performed under control of a wearable video playing device includes: transmitting identifying information for a location of the wearable video playing device to a video content provider; receiving, from the video content provider, video content information regarding a plurality of video contents recorded near the location; displaying, on a user interface, at least one video content identifier respectively corresponding to the video contents, wherein the at least one video content identifier is associated with the location; receiving an input to select one of the at least one video content identifier; and playing video content, from among the plurality of video contents recorded near the location, corresponding to the selected video content identifier.

16 Claims, 9 Drawing Sheets

(56) References Cited

U.S. PATENT DOCUMENTS

| | | | |
|---|---|---|---|
| 2015/0046884 A1* | 2/2015 | Moore | G06F 3/0485 715/863 |
| 2015/0186414 A1* | 7/2015 | Jones | G06F 17/30241 707/723 |

* cited by examiner

LOCATION BASED CONTENT PROVIDING SCHEME

TECHNICAL FIELD

The embodiments described herein pertain generally to a location based content providing scheme.

BACKGROUND

Location-based services exploit a location of a user device to control features and applications provided to or hosted on the user device. The location of the user device may be tracked by a communication service provider for the user device, or the location of the user device may be registered automatically or manually by the user device itself.

SUMMARY

In one example embodiment, a method performed under control of a wearable video playing device may include: transmitting identifying information for a location of the wearable video playing device to a video content provider; receiving, from the video content provider, video content information regarding a plurality of video contents recorded near the location; displaying, on a user interface, at least one video content identifier respectively corresponding to the video contents, wherein the at least one video content identifier is associated with the location; receiving an input to select one of the at least one video content identifier; and playing video content, from among the plurality of video contents recorded near the location, corresponding to the selected video content identifier.

In another example embodiment, a wearable video playing device may include: a transmitter configured to transmit identifying information for a location of the wearable video playing device to a video content provider; a content receiver configured to receive, from the video content provider, video content information regarding a plurality of video contents recorded near the location; a displayer configured to display, on a user interface, at least one video content identifier respectively corresponding to the video contents, wherein the at least one video content identifier is associated with the location; an input receiver configured to receive an input to select one of the at least one video content identifier; and a content player configured to play video content, from among the plurality of video contents recorded near the location, corresponding to the selected video content identifier.

In yet another example embodiment, a computer-readable storage medium having thereon computer-executable instructions that, in response to execution, cause a device to perform operations may include: transmitting identifying information for a location of the wearable video playing device to a video content provider; receiving, from the video content provider, video content information regarding a plurality of video contents recorded near the location; displaying, on a user interface, at least one video content identifier respectively corresponding to the video contents, wherein the at least one video content identifier is associated with the location; receiving an input to select one of the at least one video content identifier; and playing video content, from among the plurality of video contents recorded near the location, corresponding to the selected video content identifier.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

In the detailed description that follows, embodiments are described as illustrations only since various changes and modifications will become apparent to those skilled in the art from the following detailed description. The use of the same reference numbers in different figures indicates similar or identical items.

DETAILED DESCRIPTION

Figure 1:
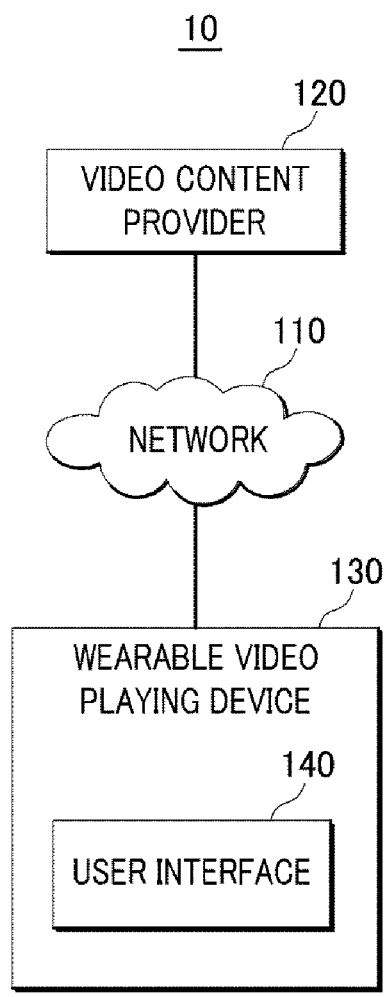
FIG. 1 shows an example system in which one or more embodiments of a location based content providing scheme may be implemented, in accordance with various embodiments described herein.

In the following detailed description, reference is made to the accompanying drawings, which form a part of the description. In the drawings, similar symbols typically identify similar components, unless context dictates otherwise. Furthermore, unless otherwise noted, the description of each successive drawing may reference features from one or more of the previous drawings to provide clearer context and a more substantive explanation of the current example embodiment. Still, the example embodiments described in the detailed description, drawings, and claims are not meant to be limiting. Other embodiments may be utilized, and other changes may be made, without departing from the spirit or scope of the subject matter presented herein. It will be readily understood that the aspects of the present disclosure, as generally described herein and illustrated in the drawings, may be arranged, substituted, combined, separated, and designed in a wide variety of different configurations, all of which are explicitly contemplated herein.

FIG. 1 shows an example system 10 in which one or more embodiments of a location based content providing scheme may be implemented, in accordance with various embodiments described herein. As depicted in FIG. 1, system configuration 10 may include, at least, a video content provider 120, and a wearable video playing device 130. At least two or more of video content providers 120 and wearable video playing devices 130 may be communicatively connected to each other via a network 110. As described herein, wearable video playing device 130 may be implemented as software, hardware, firmware, or combinations thereof.

Network 110 may be a wired or wireless information or telecommunications network. Non-limiting examples of network 110 may include a wired network such as a LAN (Local Area Network), a WAN (Wide Area Network), a VAN (Value Added Network) or the like. Other non-limiting examples of network 110 may include wireless networks such as a mobile radio communication network, including at least one of a 3rd, 4th, or 5th generation mobile telecommunications network (3G), (4G), or (5G); various other mobile telecommunications networks; a satellite network; WiBro (Wireless Broadband Internet); Mobile WiMAX (Worldwide Interoperability for Microwave Access); HSDPA (High Speed Downlink Packet Access) or the like.

The video content may be stored in a video file format appropriate for storing digital video data on a computer system, in compressed form. The video content may include a container format (e.g. Matroska) containing video data in a video coding format (e.g. VP9) alongside audio data in an audio coding format (e.g. Opus). Further, the container format may include synchronization information, subtitles, and metadata such as title, recording time, recording location, recording direction, and the like.

The type of video content may include some video file formats, such as WebM (.webm), Windows Media Video (.wmv), and Ogg Video (.ogv), each of which may only include a few well-defined subtypes of video and audio coding formats, making it relatively easy to know which codec will play the file. In addition to that, the type of video content may include AVI (.avi) and Quicktime (.mov), MPEG-4 (.mp4), and the like.

Wearable video playing device 130 may include a video player which may be a kind of media player for playing back digital video data from files of appropriate formats such as MPEG, AVI, Real Video, and QuickTime. The functions of the video player may include playing, pausing, stopping, rewinding, forwarding, zooming/full screen, audio channel selection, subtitle selection, frame capturing, and the like.

Non-limiting examples of wearable video playing device 130 may include clothing and accessories incorporating computer and advanced electronic technologies. The designs may incorporate practical functions and features. Non-limiting examples of devices may include, for example, but not as a limitation, a wearable IPTV (Internet Protocol Television) device, e.g., watch; a Smart TV (Smart TV), a wearable or mobile Connected TV, a notebook computer, a wearable personal computer, a smart phone, a digital camera, a remote controller, a tablet computer, a phablet device, or a wearable personal communication terminal, such as Google® glass, Galaxy® Gear, Apple® iWatch, etc.

For example, wearable computers, also known as body-borne computers or wearables, may be miniature electronic devices that are worn by the bearer under, with, or on top of clothing. This class of wearable technology has been developed for general or special purpose information technologies and media development. Wearable computers may be especially useful for applications that require more complex computational support than just hardware coded logic.

Wearable video playing device 130 may be configured to receive its corresponding location information from a GPS satellite or transmitter or another navigation system. Wearable video playing device 130 may then identify its location based on the received location information by transmitting the location information to video content provider 120.

After wearable video playing device 130 transmits its location information to video content provider 120, wearable video playing device 130 may receive, from video content provider 120, video content information regarding a plurality of video contents recorded near the location. For example, the received video content information may include at least one of a recording location, a recording direction, and a recording time of the plurality of video contents recorded near the identified location of wearable video playing device 130. As referenced herein, "near" may e.g. refer to a threshold distance predetermined by a communication service provider for video playing device 130. That is, video content provider 120 may transmit video content information regarding a plurality of video contents recorded within the threshold distance.

After wearable video playing device 130 receives, from video content provider 120, video content information regarding a plurality of video contents recorded near the identified location of wearable video playing device 130, wearable video playing device 130 may display, on a corresponding user interface 140, a video content identifier corresponding to one of the video contents. That is, the video content identifier may be displayed on the user interface at a representation of the location at which the video content was recorded. The video content identifier is associated with the identified location of wearable video playing device 130.

With regard to the user interface 140, the user interface 140 to be displayed on wearable video playing device 130, as non-limiting example, may include a plurality of concentric circular images respectively having different radii. According, the respective radius for each of the plurality of concentric circular images may represent a different distance from the center of the plurality of concentric circular images. That is, if the wearable video playing device 130 is located at the center, the respective radius may represent a different distance from wearable video playing device 130. Further, the difference in distance between neighbor concentric circular images may be identical in terms of meters, kilometers, feet, yards, miles, etc.

Figure 3:
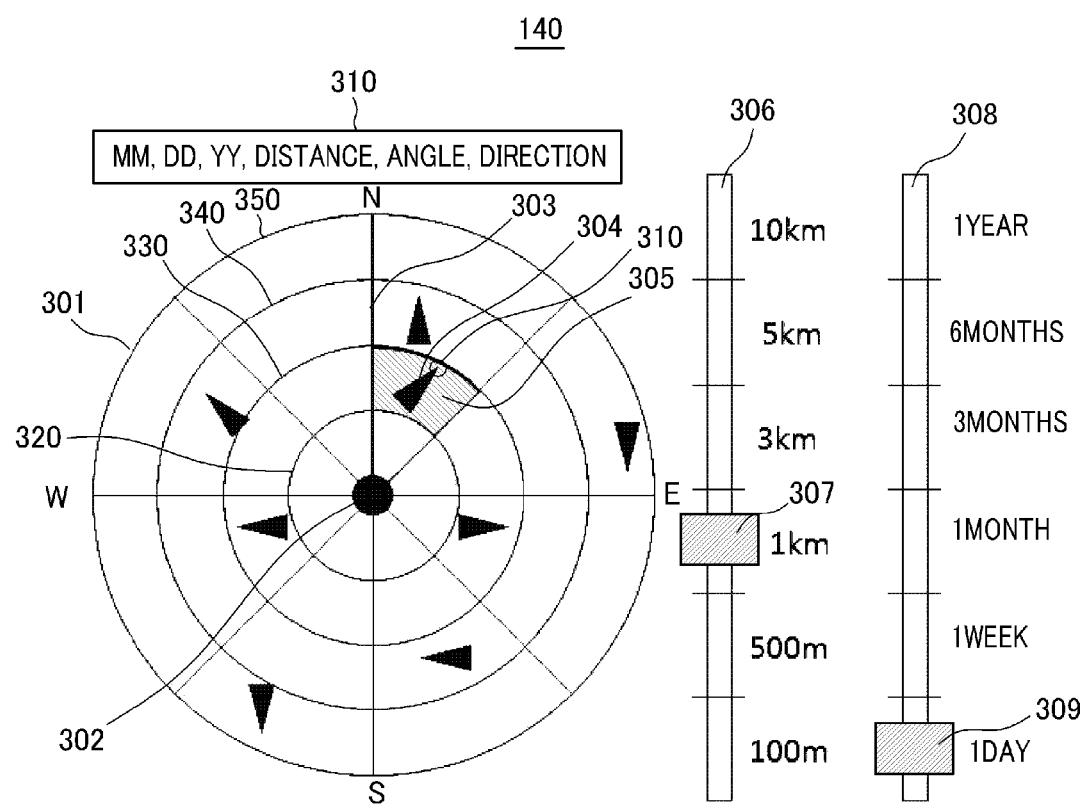
FIG. 3 shows an illustrative example implemented by at least portions of a location based content providing scheme, in accordance with various embodiments described herein.

Referring to FIG. 3, if there are four concentric circular images 301 on the user interface 140 and a default setting in distance corresponds to 1 Km, the nearest circular image 320 from the center ("a first circle") may represent 1 Km radius from the center. The second nearest circular image 330 ("a second circle") may represent 2 Km radius from the center. The third nearest circular image 340 ("a third circle") may represent 3 Km radius from the center. The fourth nearest circular image 350 ("a fourth circle") may represent 4 Km radius from the center. It is assumed that the center of the user interface 302 may correspond to the identified location of wearable video playing device 130.

With respect to location of a video content identifier 304 on the user interface 140, a video content identifier 304 may be displayed on the user interface 140 at a representation of the location at which the video content was recorded. For example, if a video content was recorded 1 Km east of the identified location of wearable video playing device 130, a video content identifier corresponding to the video content may be displayed on east point 304 of the first circle.

A video content identifier 304 may include a symbol 310 to indicate a direction in which a recording device was directed when recording the video content. That is, the video content identifier 304 may represent a recording direction 310 of a video content recorded near the location. For example, if a video camera was directed to 45 angles to north when recording the video content, the video content identifier 304 may include a pointer 310, e.g. triangle, directed 45 degrees northward on the user interface.

A video content identifier for video content recorded near the identified location of wearable video playing device 130 may also include a time stamp. A period of time within which a time-stamp may be recorded may be renewed on a rolling basis, e.g., one-day increments.

After wearable video playing device 130 displays, on the user interface, video content identifiers respectively corresponding to the video contents recorded near wearable video playing device 130, wearable video playing device 130 may receive an input to select one of the displayed video content identifiers. For example, to select one of the displayed video content identifiers, a user of wearable video playing device 130 may click or touch a video content identifier on the user interface (e.g. touch pad screen) with her finger tip.

After wearable video playing device 130 receives an input to select one of the displayed video content identifiers, wearable video playing device 130 may play video content recorded near the location, corresponding to the selected video content identifier.

Once the input to select a video content identifier is transmitted to video content provider 120, video content provider 120 may transmit the video content corresponding to the selected video content identifier via wireless network 110 to wearable video playing device 130.

Wearable video playing device 130 may be configured to display, on a user interface, a distance input field 306. For example, there may be the distance input field 306 next to the concentric circular images 301 on the user interface 140. The distance input field 306 may include 100 m, 500 m, 1 Km, 3 Km, 5 Km, and 10 Km icons representing the distance from wearable video playing device 130. Further, a pointer, e.g. block-shaped pointer 307, may be configured to indicate the distance between neighboring circles, by being placed or superimposed on one of the distance icons, e.g. 100 m, 500 m, 1 Km, 3 Km, 5 Km, and 10 Km icons.

For instance, 100 m icon may indicate that a radius from the center of the first circle may represent a distance of 100 m from the identified location of wearable video playing device 130. Similarly, the distance between the first circle and the second circle on the user interface may represent a distance of 100 m. If a pointer 307 is placed on 1 Km icon as default setting, the distance between neighbor circles may represent a distance of 1 Km.

After wearable video playing device 130 displays the distance input field 306 on a corresponding user interface 140, wearable video playing device 130 may receive a user input in the distance input field 306 to provide geographical boundaries for the location to be utilized by the video content provider 120. For example, if a user clicks or touches the 100 m icon on the distance input field 306, whereby the user interface 140 includes four circles 301 (e.g. 400 m), wearable video playing device 130 may request, from video content provider 120, information regarding video contents that were recorded within 400 m of the identified location of wearable video playing device 130 within 1 year as a default setting indicated by time input field 308.

After wearable video playing device 130 receives a user input in the distance input field 306 to provide geographical boundaries, wearable video playing device 130 may update, based on the geographical boundaries, the video content identifiers and further display the updated video content identifiers.

For example, after wearable video playing device 130 receives, from video content provider 120, information of video contents that were recorded within 400 m of the identified location of wearable video playing device 130, wearable video playing device 130 may display, within the first circle 320, the video content identifiers recorded within 100 m, and, within a space between the first and second circles, the video content identifiers recorded between 100 m and 200 m.

Similarly, wearable video playing device 130 may display, within a space between the second 330 and third circles 340, the video content identifiers recorded between 200 m and 300 m from the identified location of wearable video playing device 130; and, within a space between the third and fourth circles, the video content identifiers recorded between 300 m and 400 m from the identified location of wearable video playing device 130.

Wearable video playing device 130 may be configured to display, on a user interface 140, a time input field 308. The time input field 308 may include icons representing various time increments, e.g., 1 day, 1 week, 1 month, 3 months, 6 months, and 1 year. Wearable video playing device 130 may be configured to receive a user input on the time input field 308 to set a time period, within which the video contents were recorded, to be identified in the video content identifiers.

For example, if a user clicks or touches the 1 week icon on the time input field 308, wearable video playing device 130 may request, from video content provider 120, information of video contents that were recorded within the past week.

After wearable video playing device 130 receives a user input on the time input field 308, wearable video playing device 130 may update, based on the set time period, the video content identifiers for display.

For example, if the setting of the set time period is 1 day and there are three video files that were recorded and stored within the most recent day wearable video playing device 130 may display three video content identifiers corresponding to the three video files. If there are ten video files, including the aforementioned three video files, recorded and stored within the most recent week, when the time period is set for one week, wearable video playing device 130 may display the corresponding ten video content identifiers, as received from video content provider 120.

Thus, FIG. 1 shows an example system 10 in which one or more embodiments of a location based content providing scheme may be implemented, in accordance with various embodiments described herein.

Figure 2:
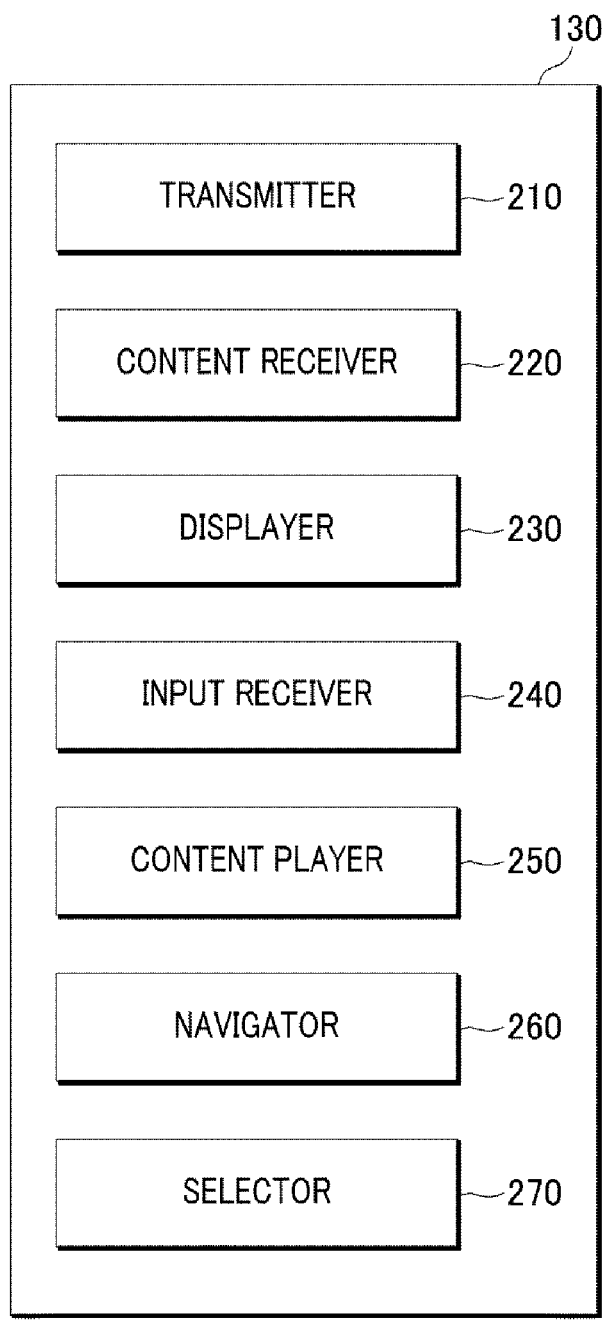
FIG. 2 shows an example device by which at least portions of a location based content providing scheme may be implemented, in accordance with various embodiments described herein.

FIG. 2 shows an example device by which at least portions of a location based content providing scheme may be implemented, in accordance with various embodiments described herein. As described herein, wearable video playing device 130 may be implemented as software, hardware, firmware, or combinations thereof.

As depicted in FIG. 2, wearable video playing device 130 may include transmitter 210 configured to transmit identifying information for a location of the wearable video playing device to a video content provider; content receiver 220 configured to receive, from the video content provider, video content information regarding a plurality of video contents recorded near the location; displayer 230 configured to display, on a user interface, at least one video content identifier respectively corresponding to the video contents, wherein the at least one video content identifier is associated with the location; input receiver 240 configured to receive an input to select one of the at least one video content identifier; and content player 250 configured to play video content, from among the plurality of video contents recorded near the location, corresponding to the selected video content identifier. Wearable video playing device 130 may further include navigator 260 configured to highlight a navigated zone, or to identify one or more video content identifiers by navigating zone including at least one video content identifier starting from the one of the identified zones; and selector configured to select, based on the received input, a first video content identifier that is positioned at an azimuth angle adjacent to a direction in which the wearable video content device is directed.

In some embodiments, transmitter 210 may be configured to transmit identifying information for a location of wearable video playing device 130 to video content provider 120. By way of example, wearable video playing device 130 may include a receiving module to receive location information of wearable video playing device 130 from GPS, or a space-based satellite navigation system that provides location and time information. Further, wearable video playing device 130 may identify its location based on the received location information and transmit the identified location to video content provider 120.

In some embodiments, content receiver 220 may be configured to receive, from video content provider 120, video content information regarding video content recorded near the identified location of wearable video playing device 130. By way of example, based on the identified location of wearable video playing device 130, video content provider 120 may search on a database that stores a plurality of video contents and their information to find video contents that were recorded within a predetermined threshold distance from the identified location of wearable video playing device 130 within a predetermined time period. The certain distance may range from 0 m to 100 Km, though not as a limiting example.

Further, after identifying video contents recorded within a certain distance from the location, video content provider 120 may transmit, to wearable video content playing device 130, the corresponding video content information including a location of the recording, a direction in which the recording device was aimed, and/or a time of recording of the video contents.

In some embodiments, referring to FIG. 3, displayer 230 may be configured to display, on a user interface 140, video content identifiers respectively corresponding to the video contents. The video content identifiers are associated with the identified location of wearable video playing device 130.

By way of example, the user interface 140 to be displayed on wearable video playing device 130 may include a circular image 301. In this instance, a radius of the circular image from the location on the user interface may be determined based on a user input to restrict a searching area in which video contents were recorded.

If a user restricts the searching area within 1 Km distance from the location, the radius on the user interface corresponding to 1 Km may correspond to 10 cm. The radius on the user interface may be determined in proportion to actual distance. Further, the user interface 140 may identify zones based on respective distances from the center 302. For example, the circular image 301 may be divided into 8 fan-shaped zones or 16 fan-shaped zones.

By way of example, if the circular image has a radius of 10 cm corresponding to 1 Km actual distance so that video content provider 120 may provide information of video contents recorded within 1 Km distance from the location, and if a video content was recorded at 500 m distance and west direction from the location, a video content identifier 304 corresponding to the video content may be displayed on a 5 cm and west point from the center of the user interface 140.

By way of example, a shape of the video content identifier 304 may include various forms including a triangle, and the video content identifier 304 may be directed to the recording direction. That is, the video content identifier 304 may represent a recording direction of a video content recorded near the location. For example, if a video camera was directed to 45 angles to north and recorded a video content, a point 310 of a video content identifier (e.g. triangle) directed to 45 angles to north may be displayed on the user interface 140.

In some embodiments, input receiver 240 may be configured to receive an input to select one of the video content identifiers displayed on the user interface 140. For example, to select one of the displayed video content identifiers, a user may click or touch a video content identifier 304 on the user interface (e.g. touch pad screen) with his finger tip. Alternatively, a user may control a Bluetooth® joy pad or control pad which generally feature a set of action buttons handled with the right thumb and a direction controller handled with the left. The direction controller may be a four-way digital cross or one or more analog sticks.

In some embodiments, content player 250 may be configured to play the video content, among the plurality of video contents recorded near the location, corresponding to the selected video content identifier.

By way of example, once the input to select a video content identifier is transmitted to video content provider 120, video content provider 120 may transmit the corresponding video content to the selected video content identifier via wireless network 110 to wearable video playing device 130.

In some embodiments, navigator 260 may be configured to highlight the navigated zone 305, if the navigated zone includes at least one video content identifier, or navigate another zone laterally proximate to the navigated zone, if the navigated zone includes no video content identifier.

By way of example, input receiver 240 may receive an input to navigate one of the identified zones, in case the circular image on the user interface is divided into 8 fan-shaped zones. For example, a user may select a first fan-shaped zone immediately right from north to be navigated, by clicking or touching the first fan-shaped zone on the user interface.

In case that the first fan-shaped zone includes at least one video content identifier, navigator 260 may highlight the first fan-shaped zone by adding translucent color to the first fan-shaped zone or by displaying the first fan-shaped zone in different color.

Alternatively, in case the first fan-shaped zone includes no video content identifier, navigator 260 may navigate another zone clockwise proximate to the first fan-shaped zone to identify at least one video content identifier. If the another zone includes no video content identifier, navigator 260 may continue to navigate the other zone clockwise proximate to the another zone until navigator 250 identifies at least one video content identifier in the navigated zone. Displayer 230 may display, on the user interface 140, at least one video content identifier included in the navigated zone.

By way of example, input receiver 240 may receive an input to navigate one of the identified zones and an input to select a navigating direction, e.g. clockwise, or counter-clockwise. For example, a user may select a second fan-shaped zone to be navigated immediately right from the first fan-shaped zone, by clicking or touching the second fan-shaped zone on the user interface 140. In addition, the user may select clockwise direction as a navigating direction.

In case the second fan-shaped zone includes no video content identifier, navigator 260 may continue to navigate, in the clockwise direction, a third fan-shaped zone immediately right from the second fan-shaped zone, until navigator 230 finds the identified zone including at least one video content identifier.

By way of example, it may be assumed that there may be a plurality of video content identifiers within an identified zone selected by a user, e.g. the first fan-shaped zone. In case navigator 230 receives an input to navigate at least one video content identifier within the identified zone, selector 270 may first select a first video content identifier that is positioned at an azimuth angle adjacent to a direction in which the wearable video content device is directed, e.g. north, within the identified zone selected by the user. Here, azimuth angle may be defined as the difference in direction between the direction line of wearable video playing device and the direction line of the video content identifier.

By way of example, it may be assumed that there may be two video content identifiers that are positioned at the same azimuth angle adjacent to a direction in which the wearable video content device is directed, e.g. north. In such a case, selector 270 may select a video content identifier closer to a center of the user interface between the two video content identifiers.

Thus, FIG. 2 shows an example device by which at least portions of a location based content providing scheme may be implemented, in accordance with various embodiments described herein.

FIG. 3 shows an illustrative example implemented by at least portions of a location based content providing scheme, in accordance with various embodiments described herein. As depicted in FIG. 3, the user interface may include four concentric circular images 301, distance input field 306, and time input field 308. Distance input field 306 and time input field 308 may be displayed together, or alternatively depending on a user input, one of two fields may be displayed.

The direction line 303 may correspond to a direction in which wearable video playing device 130 may be directed, or north, and the center 302 of four concentric circular images may correspond to location of wearable video playing device 130. A plurality of video contents may correspond to a plurality of video content identifiers on the four circular images 301.

By way of example, a point 310 of a video content identifier 304 may correspond to a direction in which the video content identifier may be directed. Further, a zone selected by a user may correspond to the highlighted section 305. Wearable video playing device 130 may display information of the selected video content identifier 304 on a display section 310, such as "year, month, day, distance from wearable video playing device 130, angle from direction line 303, and direction 310".

Thus, FIG. 3 shows an illustrative example implemented by at least portions of a location based content providing scheme, in accordance with various embodiments described herein.

Figure 4:
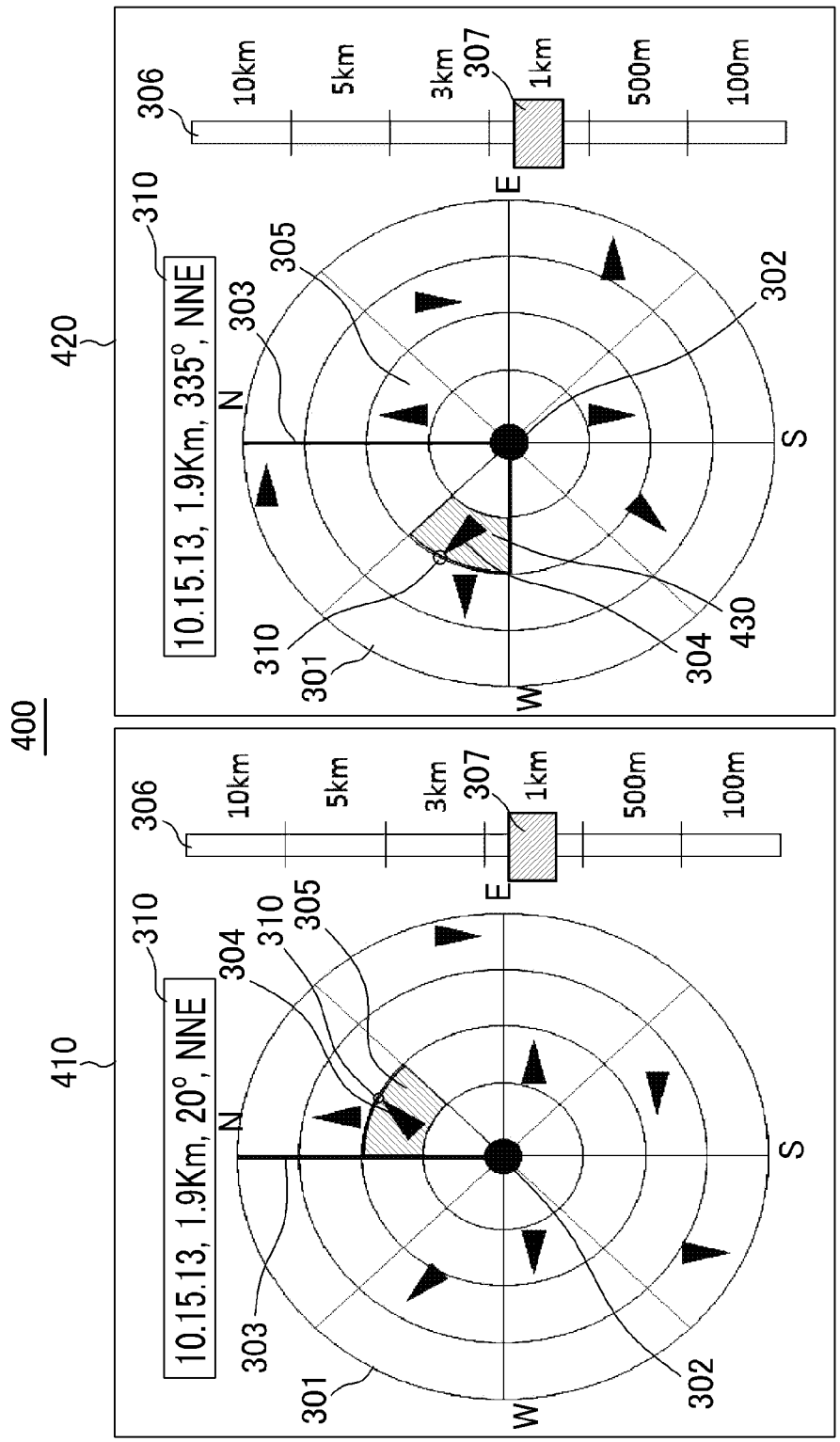
FIG. 4 shows an illustrative example implemented by at least portions of a location based content providing scheme, in accordance with various embodiments described herein.

FIG. 4 shows an illustrative example implemented by at least portions of a location based content providing scheme, in accordance with various embodiments described herein. As depicted in FIG. 4, a user interface 410 shows that distance input field 306 receives a distance input of 1 Km 307, which indicates that distance from the center 302 to the nearest circle may correspond to 1 Km. Wearable video playing device 130 may select a video content identifier 304 within a selected zone 305, and may play the video content corresponding to the video content identifier 304

A user interface 420 depicts a plurality of video content identifiers in case a direction in which wearable video playing device 130 is directed changes to 90 degrees clockwise. In such a case, the plurality of video content identifiers may be displayed after changing their direction to 90 degrees counterclockwise. The changed selected zone 430 also may moves to 90 degrees counterclockwise.

Thus, FIG. 4 shows an illustrative example implemented by at least portions of a location based content providing scheme, in accordance with various embodiments described herein.

Figure 5:
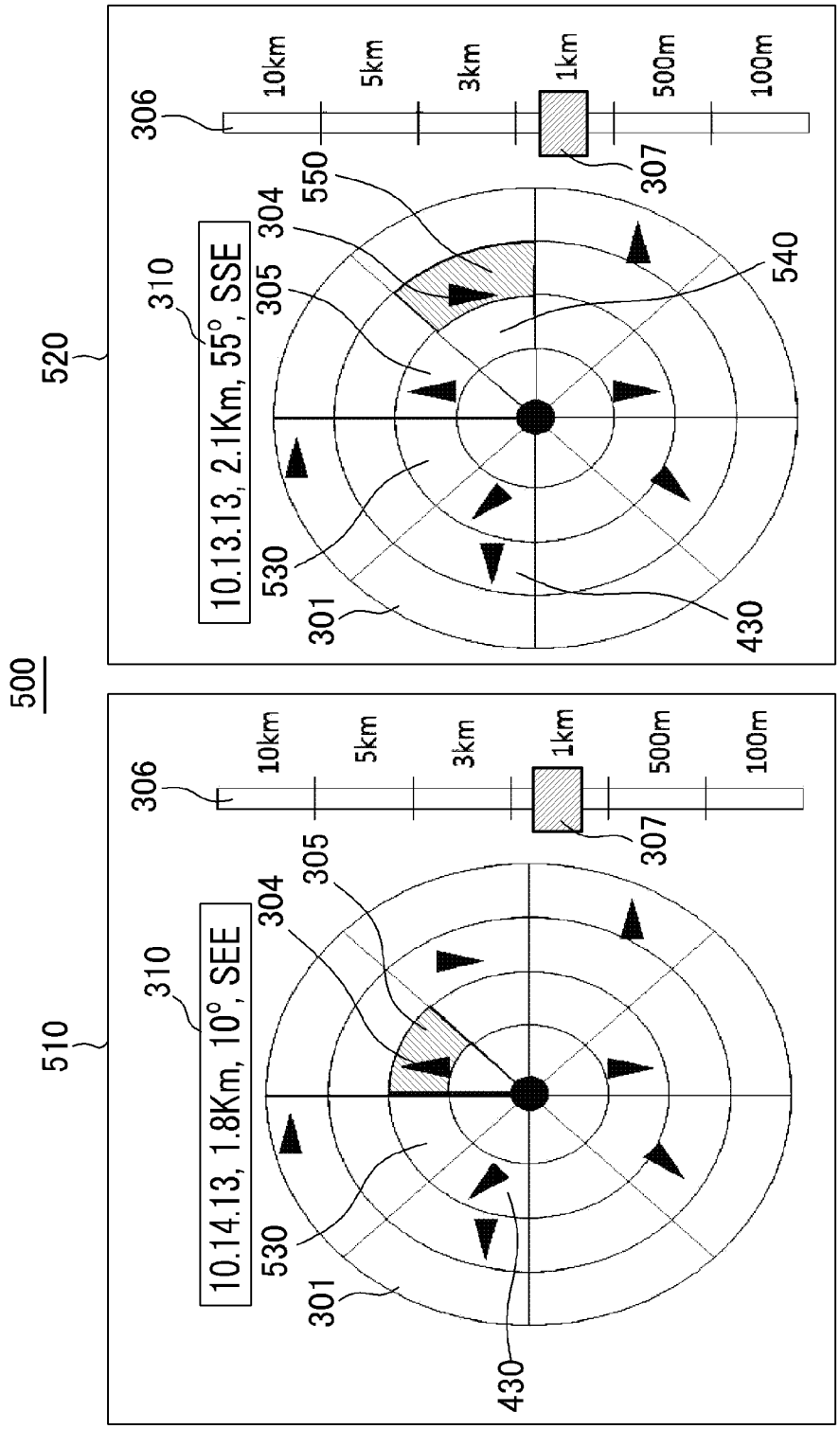
FIG. 5 shows an illustrative example implemented by at least portions of a location based content providing scheme, in accordance with various embodiments described herein.

FIG. 5 shows an illustrative example implemented by at least portions of a location based content providing scheme, in accordance with various embodiments described herein. As depicted in a screen 510, wearable video playing device 130 may navigate zone by zone counterclockwise starting from zone 430 through zone 530 to zone 305, in response to a user input to navigate zone 305. Through such a navigating path, wearable video playing device 130 may display information of video content identifiers in zone 430, zone 530, and zone 305. A user input to navigate zones may include dragging with finger tip or touch pen on external input device such as touch pad.

As depicted in a screen 520, wearable video playing device 130 may navigate zone by zone clockwise starting from zone 305 through zone 540 to zone 550, in response to a user input to navigate zone 550. Through such a navigating path, wearable video playing device 130 may display information of video content identifiers in zone 305, zone 540, and zone 550.

Thus, FIG. 5 shows an illustrative example implemented by at least portions of a location based content providing scheme, in accordance with various embodiments described herein.

Figure 6:
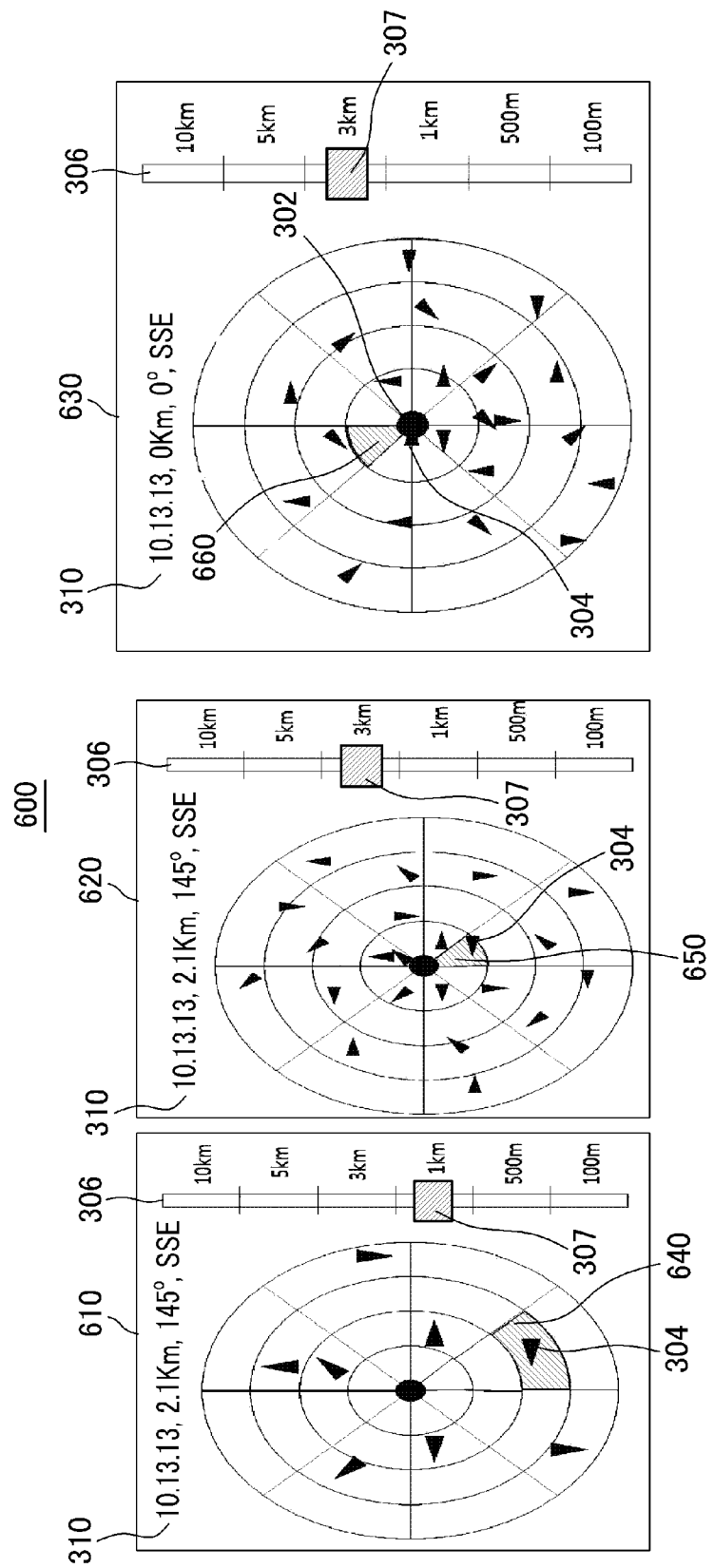
FIG. 6 shows an illustrative example implemented by at least portions of a location based content providing scheme, in accordance with various embodiments described herein.

FIG. 6 shows an illustrative example implemented by at least portions of a location based content providing scheme, in accordance with various embodiments described herein. A screen 610 depicts four concentric circular images in case distance input corresponds to 1 Km. On the contrary, a screen 620 depicts four concentric circular images in case distance input corresponds to 3 Km. The selected zone 640 in the screen 610 may move to the selected zone 650 in the screen 620.

By way of example, in the screen 620, wearable video playing device 130 may be located in the center, while in a screen 630 video content identifier 304 may be located in the center because a user may click or touch three times the corresponding point to video content identifier 304 on external input device.

As video content identifier 304 becomes a new criterion to locate the rest video content identifiers, the selected zone 650 in the screen 620 may move to the selected zone 660 in the screen 630. The rest video content identifiers may be rearranged in accordance with video content identifier 304.

Thus, FIG. 6 shows an illustrative example implemented by at least portions of a location based content providing scheme, in accordance with various embodiments described herein.

Figure 7:
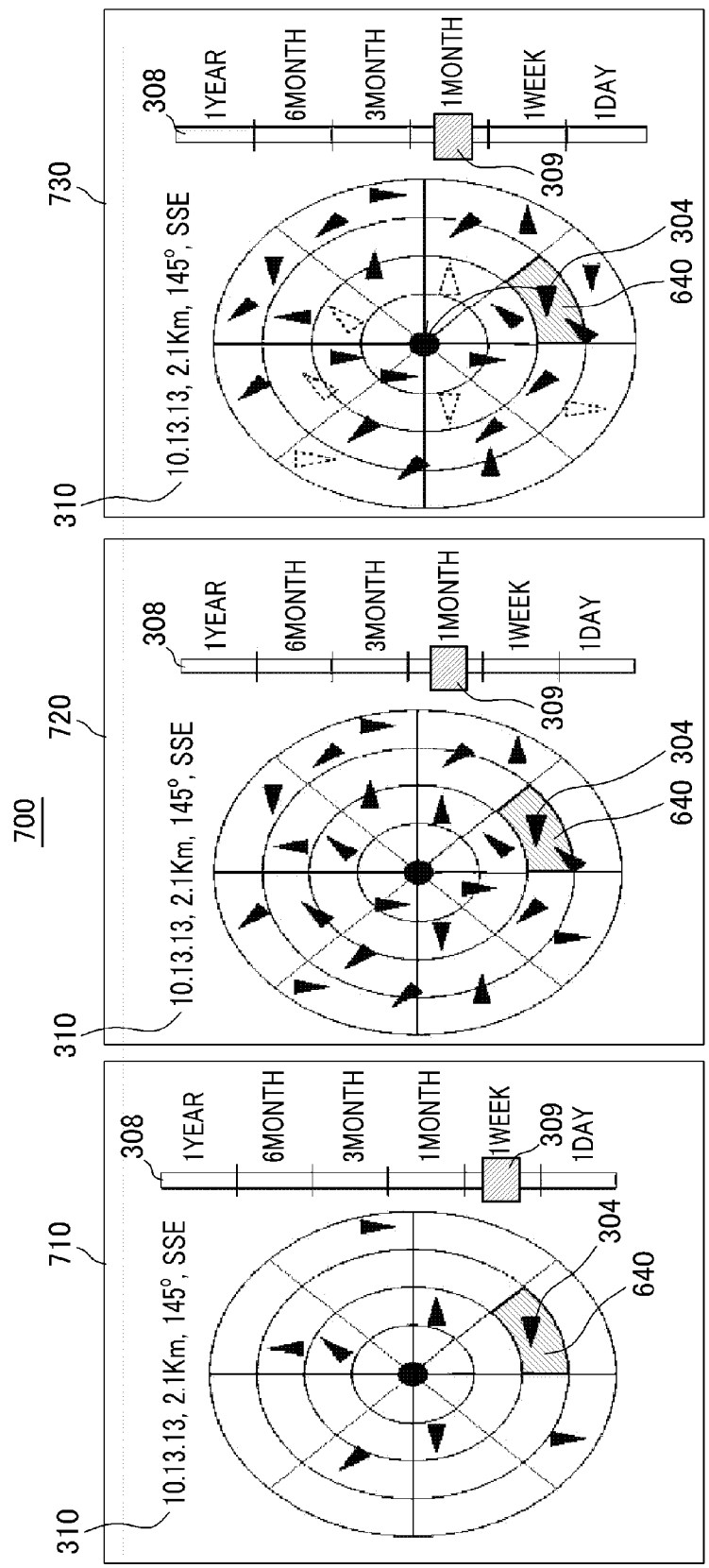
FIG. 7 shows an illustrative example implemented by at least portions of a location based content providing scheme, in accordance with various embodiments described herein.

FIG. 7 shows an illustrative example implemented by at least portions of a location based content providing scheme, in accordance with various embodiments described herein. A screen 710 depicts four concentric circular images in case time input corresponds to 1 week. Wearable video playing device 130 may receive an input to interchange distance input field with time input field. By way of example, in the screen 630, in case a user touches or clicks two times distance input field 306, wearable video playing device 130 may replace distance input field 306 with time input field 308.

On the contrary, a screen 720 depicts four concentric circular images in case time input corresponds to 1 month. If time range changes from 1 week to 1 month, wearable video playing device 130 may further display video content identifiers recorded from 1 month ago to a current time, while in the screen 710, wearable video playing device 130 may display video content identifiers recorded from 1 day ago to a current time.

By way of example, in a screen 730, when a user touches or clicks one of video content identifiers (e.g. video content identifier 304) three times, the video content identifier 304 may move to the center, and the rest video content identifiers may be rearranged based on the recording date of the video content identifier 304. That is, per the example, if the video content identifier 304 was recorded on May 5, 2013, and time input fields receive an input of 1 month, video content identifiers recorded from Apr. 5, 2013 to May 5, 2013 may be displayed on the user interface.

Thus, FIG. 7 shows an illustrative example implemented by at least portions of a location based content providing scheme, in accordance with various embodiments described herein.

Figure 8:
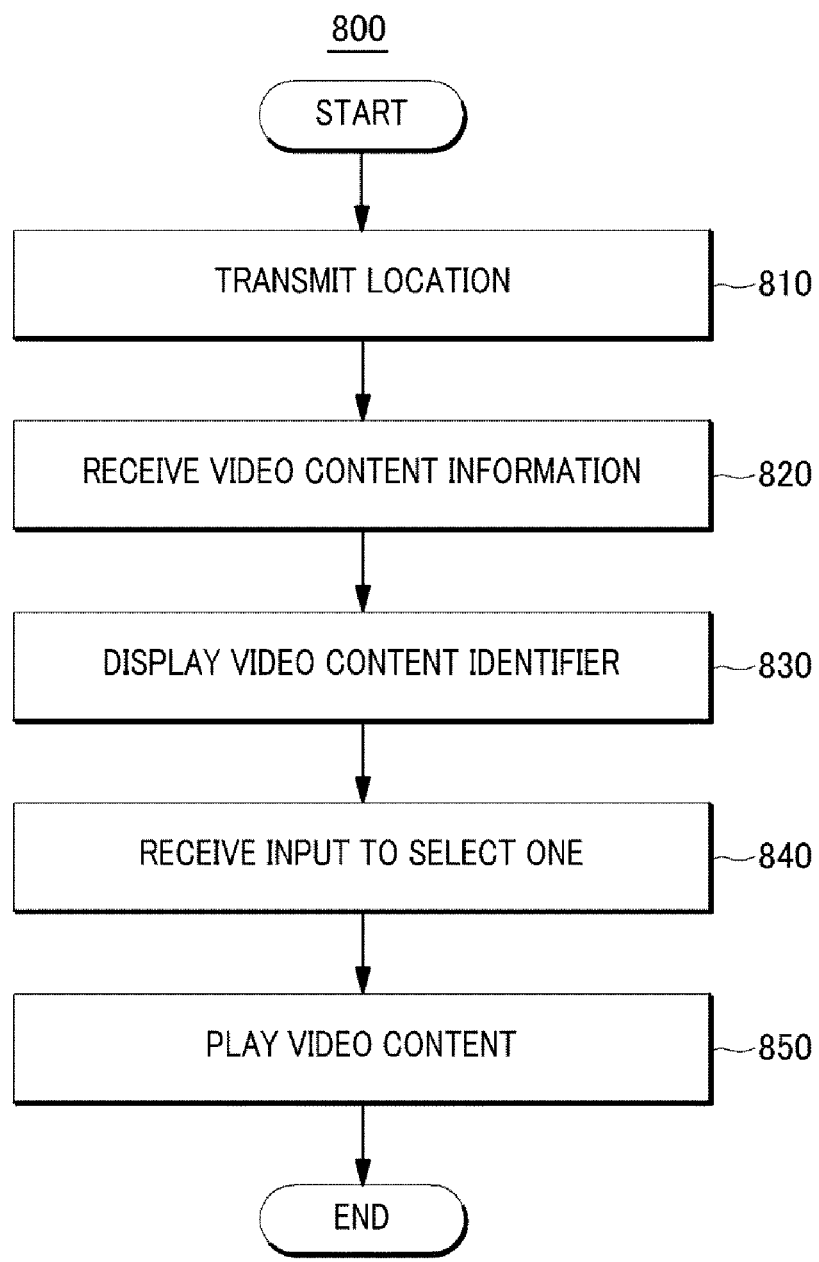
FIG. 8 shows an example processing flow of operations by which at least portions of a location based content providing scheme may be implemented, in accordance with various embodiments described herein.

FIG. 8 shows an example processing flow of operations, by which at least portions of a location based content providing scheme may be implemented, in accordance with various embodiments described herein. The operations of processing flow 800 may be implemented in system configuration 10 including network 110, video content provider 120, and wearable video playing device 130 as illustrated in FIG. 1. Processing flow 800 may include one or more operations, actions, or functions as illustrated by one or more blocks 810, 820, 830, 840 and/or 850. Although illustrated as discrete blocks, various blocks may be divided into additional blocks, combined into fewer blocks, or eliminated, depending on the desired implementation. Processing may begin at block 810.

Block 810 (transmit location) may refer to wearable video playing device 130 receiving transmitting identifying information for a location of wearable video playing device 130 to video content provider 120. Wearable video playing device 130 may include a receiving module to receive location information of wearable video playing device 130 from GPS.

By way of example, an RF module (radio frequency module) may be used as a receiving module, a usually small electronic device used to transmit and/or receive radio signals between two devices. Wireless communication may be accomplished through optical communication or through Radio Frequency (RF) communication. For many applications the medium of choice may be RF, since it may not require line of sight. RF communications may incorporate a transmitter and/or receiver. Further, wearable video playing device 130 may identify its location based on the received location information and transmit the identified location to video content provider 120. Processing may proceed from block 810 to block 820.

Block 820 (receive video content information) may refer to wearable video playing device 130 receiving, from the video content provider 120, video content information regarding a plurality of video contents recorded near the location. For example, the video content information may include at least one of a recording location, a recording direction, and a recording time of the plurality of video contents recorded near the location. "Near" may indicate the distance of certain kilo meters such as 5 kilo meters. (Kilo meters may be referred to as Km)

If the location of wearable video playing device is Seoul and a video content was recorded at 30 degree east to the north direction on a longitude and latitude datum point of Seoul in 13:30, Oct. 15, 2013, the video content information may correspond to "30° NE, latitude 37.7°, longitude 127°, 13:30, 10.15.2013." Processing may proceed from block 820 to block 830.

Block 830 (display video content identifier) may refer to wearable video playing device 130 displaying, on a user interface, at least one video content identifier respectively corresponding to the video contents, wherein the at least one video content identifier is associated with the location.

In some embodiments, with regard to the user interface, the user interface to be displayed on wearable video playing device 130, as non-limiting example, may include a plurality of square images respectively having different side. The respective sides of the plurality of square images may represent different distance from the center of the plurality of square images. The user interface may identify zones based on respective distances from the center. For example, if the four squares on the user interface are divided each by 45 degree from the north such as compass, 8 directions to divide the four squares into 8 sections may correspond to North, Northeast, East, Southeast, South, Southwest, West, and Northwest.

With respect to location of a video content identifier on the user interface, a video content identifier may be displayed in a position on the user interface corresponding to a location at which the corresponding video content was recorded near the location. For example, if a video content was recorded at 1 Km distance and east direction from the location (at right angles to north), a video content identifier corresponding to the video content may be displayed on east point of the square.

With regard to direction of a video content identifier, a shape of the video content identifier may include one of an arrow, a triangle, a unit vector, or the like, and a point of the arrow, the triangle or the unit vector may be directed to the recording direction. That is, the video content identifier may represent a recording direction of a video content recorded near the location.

For example, if a video camera was directed to 45 angles to north and recorded a video content, a point of a video content identifier (e.g. triangle) directed to 45 angles to north may be displayed on the user interface. Processing may proceed from block 830 to block 840.

Block 840 (receive input to select one) may refer to wearable video playing device 130 receiving an input to select one of the at least one video content identifier. In some embodiments, to select one of the displayed video content identifiers, a user may click or touch a video content identifier on the user interface (e.g. touch pad screen) with his finger tip. Processing may proceed from block 840 to block 850.

Block 850 (play video content) may refer to wearable video playing device 130 playing video content, from among the plurality of video contents recorded near the location, corresponding to the selected video content identifier. Once the input to select a video content identifier is transmitted to video content provider 120, video content provider 120 may transmit the corresponding video content to the selected video content identifier via wireless network 110 to wearable video playing device 130.

Thus, FIG. 8 shows an example processing flow of operations, by which at least portions of a location based content providing scheme may be implemented, in accordance with various embodiments described herein.

Figure 9:
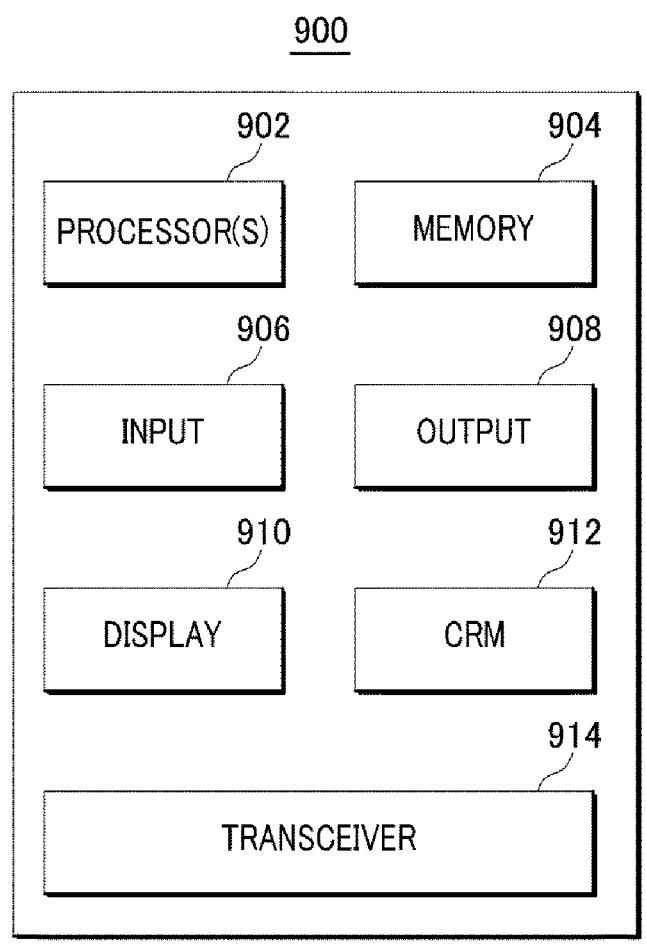
FIG. 9 shows an illustrative computing embodiment, in which any of the processes and sub-processes of a narrative generating scheme may be implemented as computer-readable instructions stored on a computer-readable medium, in accordance with various embodiments described herein.

FIG. 9 shows an illustrative computing embodiment, in which any of the processes and sub-processes of a content sharing scheme may be implemented as computer-readable instructions stored on a computer-readable medium, in accordance with various embodiments described herein. The computer-readable instructions may, for example, be executed by a processor of a device, as referenced herein, having a network element and/or any other device corresponding thereto, particularly as applicable to the applications and/or programs described above corresponding to the configuration 10 for transactional permissions.

In a very basic configuration, a computing device 900 may typically include, at least, one or more processors 902, a system memory 904, one or more input components 906, one or more output components 908, a display component 910, a computer-readable medium 912, and a transceiver 914.

Processor 902 may refer to, e.g., a microprocessor, a microcontroller, a digital signal processor, or any combination thereof.

Memory 904 may refer to, e.g., a volatile memory, non-volatile memory, or any combination thereof. Memory 904 may store, therein, an operating system, an application, and/or program data. That is, memory 904 may store executable instructions to implement any of the functions or operations described above and, therefore, memory 904 may be regarded as a computer-readable medium.

Input component 906 may refer to a built-in or communicatively coupled keyboard, touch screen, or telecommunication device. Alternatively, input component 906 may include a microphone that is configured, in cooperation with a voice-recognition program that may be stored in memory 904, to receive voice commands from a user of computing device 900. Further, input component 906, if not built-in to computing device 900, may be communicatively coupled thereto via short-range communication protocols including, but not limitation, radio frequency or Bluetooth.

Output component 908 may refer to a component or module, built-in or removable from computing device 900, that is configured to output commands and data to an external device.

Display component 910 may refer to, e.g., a solid state display that may have touch input capabilities. That is, display component 910 may include capabilities that may be shared with or replace those of input component 906.

Computer-readable medium 912 may refer to a separable machine readable medium that is configured to store one or more programs that embody any of the functions or operations described above. That is, computer-readable medium 912, which may be received into or otherwise connected to a drive component of computing device 900, may store executable instructions to implement any of the functions or operations described above. These instructions may be complimentary or otherwise independent of those stored by memory 904.

Transceiver 914 may refer to a network communication link for computing device 900, configured as a wired network or direct-wired connection. Alternatively, transceiver 914 may be configured as a wireless connection, e.g., radio frequency (RE), infrared, Bluetooth, and other wireless protocols.

From the foregoing, it will be appreciated that various embodiments of the present disclosure have been described herein for purposes of illustration, and that various modifications may be made without departing from the scope and spirit of the present disclosure. Accordingly, the various embodiments disclosed herein are not intended to be limiting, with the true scope and spirit being indicated by the following claims.

Thus, FIG. 9 shows an illustrative computing embodiment, in which any of the processes and sub-processes of a content sharing scheme may be implemented as computer-readable instructions stored on a computer-readable medium, in accordance with various embodiments described herein.

We claim:

1. A method performed under control of a wearable video playing device, comprising:
   transmitting identifying information for a location of the wearable video playing device to a video content provider;
   receiving, from the video content provider, video content information regarding a plurality of video content recorded near the location;
   displaying, on a user interface, at least one video content identifier respectively corresponding to the video content, wherein the at least one video content identifier is associated with the location and a shape of the at least one video content identifier has a pointer representing a recording direction of the corresponding video content recorded near the location;
   receiving an input to select one of the at least one video content identifier; and
   playing video content, from among the plurality of video contents recorded near the location, corresponding to the selected video content identifier,
   wherein the direction of the pointer is modified dynamically and displayed relative to a direction in which the wearable video playing device is directed.

2. The method of claim 1, further comprising:
   displaying, on the user interface, a distance input field;
   receiving a user input in the distance input field to provide geographical boundaries for the location, to be utilized by the video content provider; and
   updating, based on the geographical boundaries for the location, the at least one of the video content identifiers;
   displaying the updated at least one video content identifier;
   receiving an input to select one of the updated at least one video content identifier; and
   playing video content, from among the plurality of video content recorded near the location, corresponding to the selected updated at least one video content identifier.

3. The method of claim 1, further comprising:
   displaying, on the user interface, a time input field;
   receiving a user input on the time input field to set a time period within which at least one of the video content were recorded;

updating, based on the set time period, the at least one video content identifier;

displaying the updated at least one video content identifier;

receiving an input to select one of the updated at least one video content identifier; and playing video content, from among the plurality of video content recorded near the location, corresponding to the selected updated at least one video content identifier.

4. The method of claim 1, wherein the video content information includes at least one of a recording location, a recording direction, and a recording time for respective ones of the plurality of video contents recorded near the location.

5. The method of claim 1, wherein the user interface identifies zones based on respective distances from the wearable video playing device.

6. The method of claim 1, wherein each of the at least one video content identifier is displayed in a position on the user interface corresponding to a location at which a respective one of the plurality of video content was recorded near the location.

7. The method of claim 1, wherein a center of the user interface corresponds to a current location of the video playing device relative to the location.

8. A wearable video playing device, comprising:
a transmitter configured to transmit identifying information for a location of the wearable video playing device to a video content provider;
a content receiver configured to receive, from the video content provider, video content information regarding a plurality of video content recorded near the location;
a displayer configured to display, on a user interface, at least one video content identifier respectively corresponding to the video content, wherein the at least one video content identifier is associated with the location and a shape of the at least one video content identifier has a pointer representing a recording direction of the corresponding video content recorded near the location;
an input receiver configured to receive an input to select one of the at least one video content identifiers; and
a content player configured to play video content, from among the plurality of video content recorded near the location, corresponding to the selected video content identifier,
wherein the direction of the pointer is modified dynamically and displayed relative to a direction in which the wearable video playing device is directed.

9. The wearable video playing device of claim 8, wherein the video content information includes at least one of a recording location, a recording direction, and a recording time for respective ones of the plurality of video content recorded near the location.

10. The wearable video playing device of claim 8, wherein the user interface identifies zones based on respective distances from the wearable video playing device.

11. The wearable video playing device of claim 10, wherein the input receiver is further configured to receive an input to navigate one of the identified zones,
wherein the wearable video playing device further comprises:
a navigator configured to:
highlight the navigated zone, if the navigated zone includes at least one video content identifier, and
navigate another zone laterally proximate to the navigated zone, if the navigated zone includes no video content identifier, and wherein the displayer is further configured to display, on the user interface, at least one video content identifier included in the navigated zone.

12. The wearable video playing device of claim 10,
wherein the input receiver is further configured to receive an input to navigate one of the identified zones and an input to select a navigating direction, and
wherein the wearable video playing device further comprises:
a navigator configured to navigate, in the navigated direction, the at least one identified zone including at least one video content identifier starting from the one of the identified zones.

13. The wearable video playing device of claim 10,
wherein the input receiver is further configured to receive an input to navigate the at least one video content identifier within one of the identified zones, and
wherein the wearable video playing device further comprises:
a selector configured to select, based on the received input, a first video content identifier that is positioned at an azimuth angle adjacent to a direction in which the wearable video content device is directed.

14. The wearable video playing device of claim 13, wherein if a second and a third video content identifier are positioned at the same azimuth angle to the first video content identifier, the selector is further configured to select another of the video content identifiers that is closer to a central portion of the user interface between the second and the third video content identifier.

15. The wearable video playing device of claim 8, wherein the displayer is further configured to display, on the user interface, a distance input field,
wherein the input receiver is further configured to receive a user input in the distance input field to provide geographical boundaries for the location, to be utilized by the video content provider,
wherein the displayer is further configured to:
update, based on the geographical boundaries for the location, the at least one of the video content identifier, and
display the updated at least one video content identifier,
wherein the input receiver is further configured to receive an input to select one of the updated at least one video content identifier, and
wherein the content player is further configured to play video content, from among the plurality of video content recorded near the location, corresponding to the selected updated at least one video content identifier.

16. A non-transitory computer-readable storage medium having thereon computer-executable instructions that, in response to execution, cause a device to perform operations, comprising:
transmitting identifying information for a location of the wearable video playing device to a video content provider;
receiving, from the video content provider, video content information regarding a plurality of video content recorded near the location;
displaying, on a user interface, at least one video content identifier respectively corresponding to the video content, wherein the at least one video content identifier is associated with the location and a shape of the at least one video content identifier has a pointer representing a recording direction of the corresponding video content recorded near the location;

receiving an input to select one of the at least one video content identifier; and playing video content, from among the plurality of video contents recorded near the location, corresponding to the selected video content identifier, wherein the direction of the pointer is modified dynamically and displayed relative to a direction in which the wearable video playing device is directed.

* * * * *